(12) United States Patent
Lee et al.

(10) Patent No.: US 12,390,782 B2
(45) Date of Patent: *Aug. 19, 2025

(54) ROBUST BIJELS FOR INTERFACIAL CATALYSIS AND INTERPHASE SEPARATIONS

(71) Applicant: The Trustees of the University of Pennsylvania, Philadelphia, PA (US)

(72) Inventors: Daeyeon Lee, Wynnewood, PA (US); Kathleen Stebe, Penn Valley, PA (US); Giuseppe Di Vitantonio, Philadelphia, PA (US); Tiancheng Wang, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,531

(22) Filed: Nov. 15, 2023

(65) Prior Publication Data
US 2024/0075445 A1    Mar. 7, 2024

Related U.S. Application Data

(63) Continuation of application No. 17/053,943, filed as application No. PCT/US2019/034247 on May 29, 2019, now Pat. No. 11,857,936.

(Continued)

(51) Int. Cl.
*B01J 13/00* (2006.01)
*B01J 35/23* (2024.01)
(Continued)

(52) U.S. Cl.
CPC ......... *B01J 13/006* (2013.01); *B01J 13/0065* (2013.01); *B01J 35/23* (2024.01);
(Continued)

(58) Field of Classification Search
None
See application file for complete search history.

(56) References Cited

U.S. PATENT DOCUMENTS

2002/0044961 A1* 4/2002 Kirschner ............ A61K 9/4866
                                                              424/456
2018/0127577 A1   5/2018 Haase et al.

FOREIGN PATENT DOCUMENTS

WO    2016/201339 A1    12/2016
WO    2018/236604 A1    12/2018

OTHER PUBLICATIONS

Liu et al., Silica nanoparticles separation from water: Aggregation by cetyltrimethylammonium bromide (CTAB), Chemosphere, 2013 (Liu) (Year: 2013).*

(Continued)

*Primary Examiner* — Coris Fung
*Assistant Examiner* — Keling Zhang
(74) *Attorney, Agent, or Firm* — BakerHostetler

(57) ABSTRACT

Methods of making robust bijels include dispersing metal oxide precursors and/or metal salts into at least one phase of a bijel and hydrolyzing and condensing the metal oxide precursors and/or metal salts in a sol-gel reaction to form sintered bridges between interfacially jammed surface-active nanoparticles. The methods can be used with any bijels, including those produced during solvent transfer-induced phase separation (STRIPS) methods and other methods. A robust bijel includes chemically sintered bridges between the interfacially jammed surface-active nanoparticles. Methods of making nanocatalyst-functionalized sintered bijels include adsorbing metal salts to a surface of sintered interfacially jammed nanoparticles of bijels, and reducing the metal precursors on the surface of the sintered nanoparticles. Nanocatalyst-functionalized sintered bijels include catalyti- (Continued)

cally active metal or metal oxide nanocatalysts on a surface of the sintered interfacially jammed surface-active nanoparticles.

13 Claims, 5 Drawing Sheets

Related U.S. Application Data

(60) Provisional application No. 62/677,371, filed on May 29, 2018.

(51) Int. Cl.
| | |
|---|---|
| *B01J 37/00* | (2006.01) |
| *B01J 37/04* | (2006.01) |
| *B01J 37/08* | (2006.01) |
| *B01J 37/16* | (2006.01) |
| *B82Y 30/00* | (2011.01) |
| *B82Y 40/00* | (2011.01) |

(52) U.S. Cl.
CPC ........... *B01J 37/0072* (2013.01); *B01J 37/04* (2013.01); *B01J 37/08* (2013.01); *B01J 37/16* (2013.01); *B82Y 30/00* (2013.01); *B82Y 40/00* (2013.01)

(56) References Cited

OTHER PUBLICATIONS

Tait et al., "Speciation of aqueous palladium (II) chloride solutions using optical spectroscopies", Geochimica et Cosmochimica Acta, vol. 55, 1991, pp. 1253-1264.
Tavacoli et al., "Bicontinuous Emulsions Stabilized by Colloidal Particles"; Royal Society of Chemistry, Soft Matter Series, No. 3, Particle-Stabilized Emulsions and Colloids: Formation and Applications (Nov. 26, 2014); Chapter 6, p. 129-168 (the entire document, and more specifically: p. 130, para 1; p. 131, para 2; p. 140, para 2; p. 141, para 2-4).
Tummala et al., "Molecular dynamics simulations of surfactants at the silica-water interface: Anionic vs nonionic headgroups", Journal of colloid and interface science, vol. 362, 2011, pp. 135-143.
Wang et al., "All-Silica Colloidosomes with a Particle-Bilayer Shell", ACS Nano, vol. 5, 2011, pp. 3937-3942.
Wehrli et al., "Enantioselective hydrogenation of a-ketoesters: Influence of reaction medium and conversion", Journal of molecular catalysis, vol. 57, 1989, pp. 245-257.
Weisz et al., "Interpretation of measurements in experimental catalysis", Adv. Catal., vol. 6, 1954, pp. 143-196.
White et al., "Inversion of particle-stabilized emulsions of partially miscible liquids by mild drying of modified silica particles"; Journal of Colloid and Interface Science, vol. 359, Issue 1 (Jul. 1, 2011), p. 126-135 (the entire document).
Zapata et al., "Condensation/hydrogenation of biomass-derived oxygenates in water/oil emulsions stabilized by nanohybrid catalysts", Topics in Catalysis, vol. 55, 2012, pp. 38-52.
Zhu et al., "Tailoring the mesopore structure of HZSM-5 to control product distribution in the conversion of propanal", Journal of Catalysis, vol. 271, 2010, pp. 88-98.
Binks et al., "Colloidal particles at liquid interfaces", Cambridge University Press, 2006.
Blaser et al., "Enantioselective hydrogenation of a-ketoesters with cinchona-modified platinum catalysts: Effect of acidic and basic solvents and additives", Journal of molecular catalysis, vol. 68, 1991, pp. 215-222.
Briggs et al., "In Characterization of oxidized and pristine carbon nanotube stabilized Pickering emulsion, Abstracts of Papers of the American Chemical Society", Amer Chemical Soc 1155 16th St, NW, Washington, DC 20036 USA: 2014.

Briggs et al., "Multiwalled Carbon Nanotubes at the Interface of Pickering Emulsions", Langmuir, vol. 31, 2015, pp. 13077-13084.
Brugarolas et al., "Generation of Amphiphilic Janus Bubbles and Their Behavior at an Air-Water Interface", Advanced Functional Materials, vol. 21, 2011, pp. 3924-3931.
Carberry, "Physico-chemical aspects of mass and heat transfer in heterogeneous catalysis", In Catalysis, Springer, 1987, pp. 131-171.
Cates et al., "Bijels: a new class of soft materials", Soft Matter, vol. 4, 2008, pp. 2132-2138.
Crossley et al., "Solid nanoparticles that catalyze biofuel upgrade reactions at the water/oil interface, Science", vol. 327, 2010, pp. 68-72.
Dietrich et al., "Aqueous Phase Glycerol Reforming with Pt and PtMo Bimetallic Nanoparticle Catalysts: The Role of the Mo Promoter", Topics in Catalysis, vol. 56, 2013, pp. 1814-1828.
Djéga-Mariadassou et al., "Classical kinetics of catalytic reactions", Journal of Catalysis, vol. 216, 2003, pp. 89-97.
Faria et al., "Phase-Selective Catalysis in Emulsions Stabilized by Janus Silica-Nanoparticles", Advanced Synthesis & Catalysis, vol. 352, 2010, pp. 2359-2364.
Gangadharan et al., "Condensation reactions of propanal over Ce x Zr 1− x O 2 mixed oxide catalysts", Applied Catalysis A: General, vol. 385, 2010, pp. 80-91.
Georgiev et al., "Rheology of particle/water/oil three-phase dispersions: Electrostatic vs. capillary bridge forces"; Journal of Colloid and Interface Science, vol. 513 (Mar. 1, 2018), p. 515-526 (the entire document).
Ghanadzadeh et al., "Liquid-liquid equilibrium data for water + ethanol + trans-decalin: Measurement and prediction", Fluid Phase Equilibria, vol. 243, 2006, pp. 45-50.
Gilbert et al., "Solvent effects in heterogeneous catalysis: Application to the synthesis of fine chemicals", Studies in Surface Science and Catalysis, vol. 78, 1993, pp. 51-66.
Gonzo et al., "Catalytic hydrogenation of cyclohexene: 3. Gas-phase and liquid-phase reaction on supported palladium", Journal of Catalysis, vol. 52, 1978, pp. 462-471.
Haase et al., "Continuous Fabrication of Hierarchical and Asymmetric Bijel Microparticles, Fibers, and Membranes by Solvent Transfer-Induced Phase Separation (STRIPS)", Advanced Materials, vol. 27, 2015, pp. 7065-7071.
Haase et al., "In Situ Mechanical Testing of Nanostructured Bijel Fibers", ACS Nano, vol. 10, 2016, pp. 6338-6344.
Herzig et al., "Bicontinuous emulsions stabilized solely by colloidal particles", Nature materials, vol. 6, 2007, pp. 966-971.
Hoang et al., "A comparison of the reactivities of propanal and propylene on HZSM-5", Journal of Catalysis, vol. 271, 2010, pp. 201-208.
Hor et al., "Nanoporous Polymer-Infiltrated Nanoparticle Films with Uniform or Graded Porosity via Undersaturated Capillary Rise Infiltration", Acs Nano, vol. 11, 2017, pp. 3229-3236.
Huang et al., "Polymer nanocomposite films with extremely high nanoparticle loadings via capillary rise infiltration (CaRI)", Nanoscale, vol. 7, 2015, pp. 798-805.
Koopman et al., "Solvent-Reactant-Support interactions in liquid phase hydrogenation", Recueil des Travaux Chimiques des Pays-Bas, vol. 100, 1981, pp. 156-161.
Kumar et al., "Amphiphilic Janus particles at fluid interfaces", Soft Matter, vol. 9, 2013, pp. 6604-6617.
Lee et al., "Antibacterial Properties of Ag Nanoparticle Loaded Multilayers and Formation of Magnetically Directed Antibacterial Microparticles", Langmuir, vol. 21, 2005, pp. 9651-9659.
Lee et al., "Double Emulsion-Templated Nanoparticle Colloidosomes with Selective Permeability", Advanced Materials, vol. 20, 2008, pp. 3498-3503.
Lee et al., "Formation of Nanoparticle-Loaded Microcapsules Based on Hydrogen-Bonded Multilayers", Chemistry of Materials, vol. 17, 2005, pp. 1099-1105.
Li et al., "Two-Level Antibacterial Coating with Both Release-Killing and Contact-Killing Capabilities", Langmuir, vol. 22, 2006, pp. 9820-9823.
Madon et al., "Catalytic hydrogenation of cyclohexene: Part II. Liquid phase reaction on supported platinum in a gradientless slurry reactor", AIChE Journal, vol. 24, 1978, pp. 904-911.

(56) References Cited

OTHER PUBLICATIONS

Madon et al., "Catalytic reaction rates in thermodynamically non-ideal systems," Journal of Molecular Catalysis A: Chemical, vol. 163, 2000, pp. 189-204.

Madon et al., "Experimental criterion for the absence of artifacts in the measurement of rates of heterogeneous catalytic reactions", Industrial & Engineering Chemistry Fundamentals, vol. 21, 1982, pp. 438-447.

Makosza et al., "Phase transfer catalysis", Catalysis Reviews, vol. 45, 2003, pp. 321-367.

Mallinson et al., "In Etherification of 2-methyl-pentanal on supported palladium", Abstracts of Papers of the American Chemical Society, Amer Chemical Soc 1155 16th St, NW, Washington, DC 20036 USA: 2009.

Mukherjee et al., "Solvent effects in liquid-phase reactions II. Kinetic modeling for citral hydrogenation", Journal of Catalysis, vol. 243, 2006, pp. 131-148.

Mukherjee et al., "Solvent effects in liquid-phase reactions: I. Activity and selectivity during citral hydrogenation on Pt/SiO2 and evaluation of mass transfer effects", Journal of Catalysis, vol. 243, 2006, pp. 108-130.

Park et al., "Equilibrium Orientation of Nonspherical Janus Particles at Fluid-Fluid Interfaces", Acs Nano, vol. 6, 2012, pp. 782-790.

Park et al., "Geometrically and chemically anisotropic particles at an oil-water interface", Soft Matter, vol. 9, 2013, pp. 3383-3388.

Park et al., "Janus particles at an oil-water interface", Soft Matter, vol. 7, 2011, pp. 6413-6417.

Parthasarathi et al., "Embedded single-walled carbon nanotubes locally perturb DOPC phospholipid bilayers", The Journal of Physical Chemistry B, vol. 116, 2012, pp. 12769-12782.

Pera-Titus et al., "Pickering Interfacial Catalysis for Biphasic Systems: From Emulsion Design to Green Reactions", Angewandte Chemie International Edition, vol. 54, 2015, pp. 2006-2021.

Ruiz et al., "Nanostructured Carbon—Metal Oxide Hybrids as Amphiphilic Emulsion Catalysts", ChemSusChem, vol. 4, 2011, pp. 964-974.

Schoenmakers et al., "Reactive and catalytic distillation from an industrial perspective," Chemical Engineering and Processing: Process Intensification, vol. 42, 2003, pp. 145-155.

Shen et al., "Emulsions Stabilized by Carbon Nanotube—Silica Nanohybrids," Langmuir, vol. 25, 2009, pp. 10843-10851.

Shi et al., "Single-walled carbon nanotubes do not pierce aqueous phospholipid bilayers at low salt concentration", The Journal of Physical Chemistry B, vol. 117, 2013, pp. 6749-6758.

Shu et al., "Catalytic palladium-based membrane reactors: A review", The Canadian Journal of Chemical Engineering, vol. 69, 1991, pp. 1036-1060.

Sitthisa et al., "Kinetics and mechanism of hydrogenation of furfural on Cu/SiO 2 catalysts", Journal of Catalysis, vol. 277, 2011, pp. 1-13.

Stratford et al., "Colloidal jamming at interfaces: A route to fluid-bicontinuous gels", Science, vol. 309, 2005, pp. 2198-2201.

Struijk et al., "Partial liquid phase hydrogenation of benzene to cyclohexene over ruthenium catalysts in the presence of an aqueous salt solution: I. Preparation, characterization of the catalyst and study of a number of process variables", Applied Catalysis A: General, vol. 83, 1992, pp. 263-295.

Suttipong et al., "Role of surfactant molecular structure on self-assembly: aqueous SDBS on carbon nanotubes", The Journal of Physical Chemistry C, vol. 115, 2011, pp. 17286-17296.

Suttipong et al., "Salt-specific effects in aqueous dispersions of carbon nanotubes", Soft Matter, vol. 9, 2013, pp. 3712-3719.

\* cited by examiner

ROBUST BIJELS FOR INTERFACIAL CATALYSIS AND INTERPHASE SEPARATIONS

CROSS-REFERENCE TO RELATED APPLICATIONS

This application is a Continuation Application of U.S. application Ser. No. 17/053,943, filed Nov. 9, 2020, which is the National Stage Application of International Patent Application No. PCT/US2019/034247, filed May 29, 2019, which claims priority to U.S. Provisional Application No. 62/677,371, "Robust Bijels For Interfacial Catalysis And Interphase Separations" (filed May 29, 2018). All foregoing applications are incorporated herein by reference in their entireties for any and all purposes.

TECHNICAL FIELD

The present disclosure relates to chemically and mechanically robust bicontinuous interfacially jammed emulsions (bijels), chemically and mechanically robust bijels functionalized with nanocatalysts or with catalysts soluble in one or both of the fluid phases, and to methods of making the same.

BACKGROUND

Simultaneous operation of catalyzed reactions and chemical separation is an important focus of study for the modern chemical industry. An example of simultaneous catalysis and separation is phase-transfer catalysis. In this method, reactions are carried out in a biphasic liquid system (e.g., water and a hydrophobic liquid) and surfactants are added to enhance the transfer of molecules between phases, increase the interfacial surface area (emulsification), and improve selectivity. This approach protects valuable products from undesired secondary reactions (e.g., thermal decomposition) by moving them from the reacting phase to the other phase based on solubility. Partitioning of by-products on the basis of their relative solubility can also substantially simplify separation of products, obviating the need for steps such as distillation that might damage heat-sensitive compounds and high molecular weight species.

However, phase-transfer catalysis suffers from a major drawback; the need to separate surfactants from the reaction mixture requires expensive purification methods. One method, particle-stabilized emulsion-based phase-transfer catalysis, circumvents this disadvantage by replacing surfactants with interfacially-active catalyst particles that can be readily recovered and reused after each catalytic cycle. In this scheme, each droplet, covered with catalyst particles, acts as either a batch reactor or absorber, depending on whether reagent in the droplet reacts and product partitions to the external phase, or reagent in the external phase forms drop-soluble products. This novel methodology combines the advantages of phase transfer and heterogeneous catalysis, which include: a) increased interfacial area, b) enhanced mass transfer of molecules between the two phases, c) simplified reaction/separation process by using a recoverable solid catalyst instead of surfactant, and d) effective separation of products from the reaction mixture by differences in the water-oil solubility (thereby avoiding separation methods that rely on heating and associated product decomposition).

Despite these advantages, particle-stabilized emulsion-based phase-transfer catalysis has a critical flaw that limits its widespread utilization: simultaneous catalyzed reaction and separation cannot be easily performed in a continuous mode. One important limitation in emulsion catalysis is that the droplets are dispersed in the external phase. Once reagent within the droplet reactors is exhausted, or droplet absorbers become saturated with a product, their regeneration or product retrieval becomes a complex issue. Emulsion-based approaches require excessive energy to break droplets to retrieve products or by-products, or to reform and re-disperse droplets to begin the reaction anew.

Thus, there remains a need for methods of producing compositions capable of carrying out simultaneous operation of catalyzed reactions and chemical separation in a continuous mode, and a need for such compositions themselves. Moreover, there remains a need for methods of producing compositions capable of carrying out simultaneous homogeneous and/or heterogeneous catalysis and phase transfer separation, and a need for such compositions.

Bijels are bicontinuous emulsion gels that are stabilized by jammed particles at the interface between oil and water phases. They have a bicontinuous morphology that allows continuous addition and removal of agents as well as interphase mass transfer, making them a powerful platform to enable continuous catalysis and reactive separations. However, bijels as fabricated by current methods do not possess sufficient mechanical and chemical robustness for the challenging chemical conditions under which continuous catalysis and reactive separation often take place, and the utility of bijels is often limited because they lose their morphology under mild mechanical agitation. Bijels can also lose their structure if they are heated or co-solvents are added to the media. Furthermore, particle-stabilized emulsion morphology can be altered by process condition changes like pH variations. Preserving the emulsion morphology after mechanical stimulation or heating, pH and solvent changes is of paramount importance to the successful utilization of bijels in continuous catalysis and reactive separation technology. Moreover, it is important that the interphase mass transfer properties of bijels are not affected by imparting chemical and mechanical robustness.

SUMMARY

The disclosed technology relates to, inter alia, methods of making robust, chemically and mechanically stabilized bicontinuous liquid media (robust bijels). The methods include dispersing metal oxide precursors or semimetal oxide precursors into at least one phase of a bicontinuous interfacially jammed emulsion (bijel); and hydrolyzing and condensing the metal oxide precursors in a sol-gel reaction to form bridges between interfacially jammed surface-active nanoparticles of the bijel. The interfacially jammed nanoparticles of the bijel are chemically "sintered" using sol-gel chemistry to form the hydrolyzed and condensed metal oxide bridges. The methods can be used with any bijels, including those produced during solvent transfer-induced phase separation (STRIPS) methods and other methods.

A further example of the disclosed technology relates to chemically and mechanically robust sintered bijels that enable continuous and simultaneous phase-selective catalysis and separation, without compromising the interphase mass transfer properties of the bijels. The sintered bijels include a stable mixture of two immiscible liquids separated at an interface by one or more layers of jammed surface-active nanoparticles, and chemically formed bridges between the interfacially jammed surface-active nanoparticles. Metal oxide precursors can be used to "sinter" the bijel by forming metal oxide bridges between the nanoparticles.

Another example of the disclosed technology relates to methods of making nanocatalyst-functionalized sintered bijels. The methods include adsorbing metal salts to a surface of the sintered interfacially jammed nanoparticles of the bijels, and reducing or reacting in situ the metal precursors on the surface of the sintered nanoparticles to subsequently form metal nanocatalysts. The bijels can also be catalytically functionalized by dissolving soluble catalysts in one or both of the fluid phases of the bijels.

Yet another example of the disclosed technology relates to sintered bijels useful for both homogeneous and heterogeneous phase-selective catalysis and separation. Bijels for homogeneous catalysis can be produced using stabilized sintered bijels and adding homogeneous catalysts (e.g., acids or bases) to one of the two liquid phases (i.e., the aqueous or the hydrophobic phase). Soluble catalysts can be added to both phases of the bijel as well for homogeneous catalysis. The nanocatalyst-functionalized sintered bijels can also include catalytically active metal nanocatalysts on surfaces of the sintered interfacially jammed surface-active nanoparticles to form bijels suitable for heterogeneous catalysis.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

In the drawings.

DETAILED DESCRIPTION OF ILLUSTRATIVE EMBODIMENTS

Figure 1:
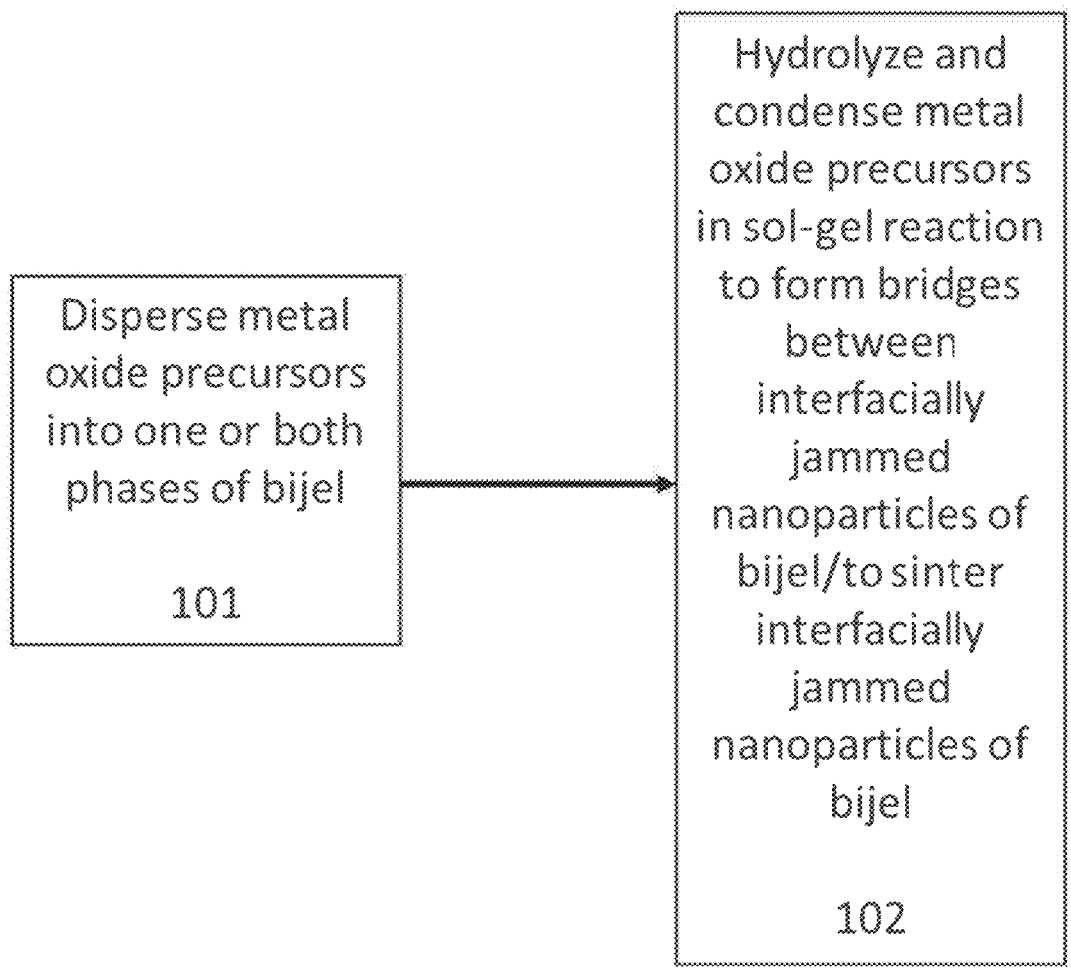
FIG. 1 provides a method of producing robust, sintered bijels according to aspects of the disclosed technology.

The present disclosure may be understood more readily by reference to the following detailed description taken in connection with the accompanying figures and examples, which form a part of this disclosure. It is to be understood that this technology is not limited to the specific devices, methods, applications, conditions or parameters described and/or shown herein, and that the terminology used herein is for the purpose of describing particular embodiments by way of example only and is not intended to be limiting of the claimed technology.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps may be performed in any order.

It is to be appreciated that certain features of the technology which are, for clarity, described herein in the context of separate embodiments, may also be provided in combination in a single embodiment. Conversely, various features of the technology that are, for brevity, described in the context of a single embodiment, may also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B may include parts in addition to Part A and Part B, but may also be formed only from Part A and Part B.

Provided here are new methods for producing chemically and mechanically robust "sintered" bijels for continuous and simultaneous phase-transfer catalysis and separation. Also provided are new methods for functionalizing "sintered" bijels to allow for not only homogeneous phase-transfer catalysis and separation, but also heterogeneous phase-transfer catalysis and separation. In particular, it has been discovered that bijels can be stabilized and functionalized for a wide variety of chemical processes involving simultaneous catalyzed reaction and separation, which bijels can be tailored to various chemical and industrial processes.

Provided are robust "sintered" bijels that have chemical, thermal, and mechanical stability to accommodate a broad range of conditions involved in simultaneous catalytic reactions and separations. Examples of the robust bijels allow for interphase mass transfer with little resistance and remain intact after drying. The robust bijels withstand capillary stresses without damage to the bijel structure when subjected to shear and agitation. Therefore, these sintered bijels can be used to create bijel reactors that allow continuous and scalable catalytic reactive separation impossible in conventional emulsion systems with batch processes. By placing the bijel at an aqueous-oil interface, the bijel's internal hydrophobic/oil channels will be in contact with the external oil phase. Similarly, the internal hydrophilic/aqueous channels will be in contact with the external aqueous phase. Reagents can be continuously supplied, products harvested, and unwanted by-products removed by mass transfer to the outer fluids, allowing the interfacial catalyzed processes previously driven only in the "batch reactors" of emulsion drops to be driven continuously.

As used herein, "sintering" is the formation of bridges between interfacially jammed nanoparticles of a bijel by inducing the hydrolysis and condensation of metal oxide precursors dispersed in at least one of the phases of the bijel via sol-gel reaction chemistry. The metal oxide precursors form the bridges between the nanoparticles such that the interfacially jammed nanoparticles are stabilized in their configuration, and the resulting bijels are resistant to changes in pH, temperature, the chemical environment, and the introduction of mechanical perturbation.

As used herein, surface-active nanoparticles are nanoparticles (e.g., silica nanoparticles, zinc oxide nanoparticles) capable of congregation at an interface between immiscible phases. The surface-active nanoparticles can, but need not, be produced by treating nanoparticles with an oppositely-charged ionic surfactant, whereby the surfactant imparts surface activity to the nanoparticles by interacting electrostatically with the surface of the nanoparticles. Examples of the technology can include methods of mixing nanoparticles with ionic surfactant to provide the surface-active nanoparticles. Other examples of the technology do not use surfactant to produce surface-active nanoparticles or the resulting bijels.

Provided is a new class of robust bijels that feature sintered bridges. The bridges can be formed from sintered metal oxides (e.g., silica, titania, alumina, zirconia, copper oxide, tin oxide, and nickel oxide) between the particles, or from functionalized nanoparticles exposed to a secondary agent (e.g., amine-functionalized silica nanoparticles linked using di-carboxylic acid). These robust bijels are bijel analogues of colloidosomes—they are remarkably strong and withstand high shear, but can continue to sequester hydrophobic/oil—hydrophilic/water bicontinuous phases and to allow interphase mass transfer between the two phases.

One can use these sintered bijels to create bijel reactors with soluble catalysts dissolved in one or both phases of the bijel, and with nanocatalysts arranged at the nanoparticle surface; the bicontinuous structure features internal, interconnected oil/hydrophobic channels entwined with internal, interconnected aqueous/hydrophilic channels. The oil/hydrophobic channels are sequestered from the aqueous/hydrophilic channels by the interfacially jammed, sintered nanoparticles of the bijel.

The sintered bijel reactors can be connected to external aqueous/hydrophilic and oil/hydrophobic phases wherein reagents in the interconnected channels can be continuously replenished from external aqueous/hydrophilic phase or oil/hydrophobic phase (as appropriate), and products in the interconnected channels can be continuously removed, allowing continuous catalytic reactive separation impossible in conventional emulsion systems. The catalytic reactions of such functionalized sintered bijels can be homogeneous (with soluble catalysts dispersed in one or both bijel domains) or heterogeneous (with nanocatalysts arranged at the surface of the sintered nanoparticles). Physically and chemically robust bijels incorporating catalytic nanoparticles, for instance, could function as microscale crossflow reaction media for biofuel upgrade reactions, enabling continuous mass transfer of reagents in and out of the structure and simultaneously allowing for interfacial catalysis and interphase mass transfer of reactants and products.

According to particular examples, a robust sintered bijel is produced by (step 101) first dispersing metal oxide precursors into one or both of the oil/hydrophobic phase or aqueous/hydrophilic phase of the bijel (FIG. 1). Then, (step 102) the metal oxide precursors (MO) are hydrolyzed and condensed in a sol-gel reaction to form sintered bridges between the interfacially jammed nanoparticles.

Figure 2:
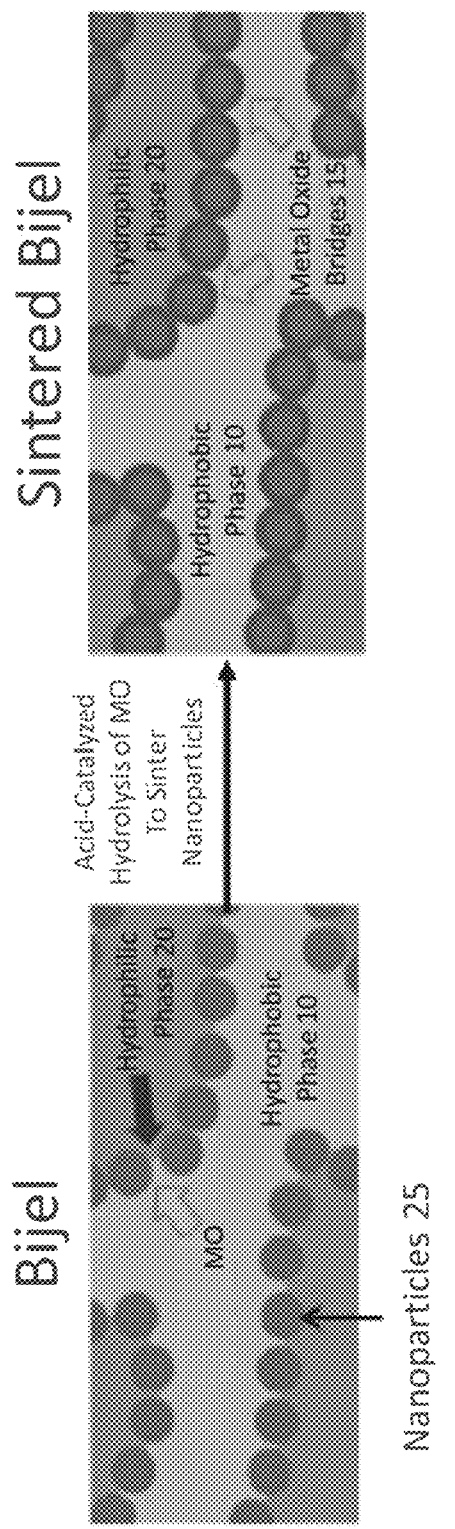
FIG. 2 provides a depiction of the process of stabilizing a bijel via sol-gel chemistry according to aspects of the disclosed technology.

FIG. 2 provides an illustration of the process carried out according to FIG. 1. Metal oxide precursors (MO) are dispersed into the hydrophobic phase 10 at step 101. The MO in the hydrophobic phase 10 are hydrolyzed and condensed amongst the interfacially jammed nanoparticles 25 at step 102 to "sinter" the nanoparticles 25 together. After sintering, metal oxide bridges 15 between the nanoparticles 25 stabilize and connect the nanoparticles 25, and maintain the separation of the hydrophobic phase 10 from the hydrophilic phase 20 at the interface of the bijel. The sintered bridges 15 impart chemical, thermal, and mechanical robustness to the bijels (FIG. 2). It should be understood that nanoparticles can also bear one or more moieties (e.g., metal oxide precursors) that are reacted to bind adjacent nanoparticles to one another.

Figure 3:
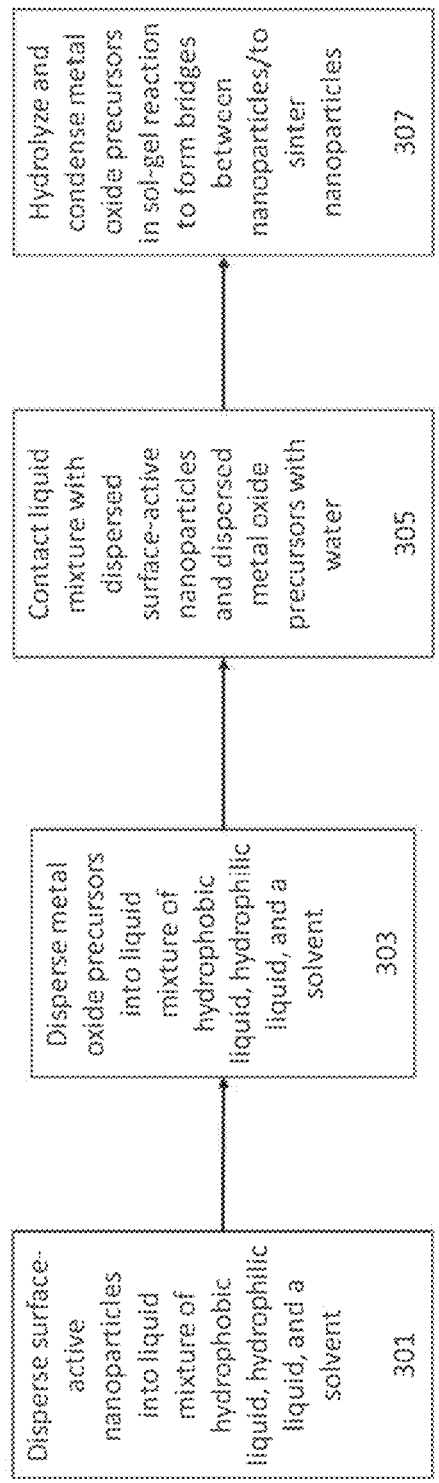
FIG. 3 provides a method of producing robust, sintered bijels using the STRIPS process according to aspects of the disclosed technology.

Robust sintered bijels can be produced by, e.g., using the solvent transfer-induced phase separation (STRIPS) method (FIG. 3). Using the STRIPS method allows for the production of bijels using a wide range of combinations of hydrophobic/oil phase and hydrophilic/aqueous phase pairs and nanoparticle types. First, (step 301) nanoparticles are dispersed into a liquid mixture including at least one hydrophobic liquid/oil phase, at least one hydrophilic liquid/aqueous phase, and at least one solvent to mediate miscibility between the hydrophobic liquid/oil phase and hydrophilic liquid/aqueous phase (e.g., a ternary liquid mixture).

At step 303, metal oxide precursors are then dispersed into one or both of the oil/hydrophobic phase or aqueous/hydrophilic phase of the liquid mixture. The liquid mixture having dispersed nanoparticles and metal oxide precursors is then contacted with water at step 305 to induce a phase separation and a jamming (e.g., close packing) of the surface-active nanoparticles at the interface between the hydrophobic liquid/oil phase and hydrophilic liquid/aqueous phase. Finally, at step 307, the metal oxide precursors are hydrolyzed and condensed in a sol-gel reaction to form sintered bridges between the interfacially jammed nanoparticles. The resulting robust bijels can be used for homogeneous catalysis and phase transfer separation.

Figure 4:
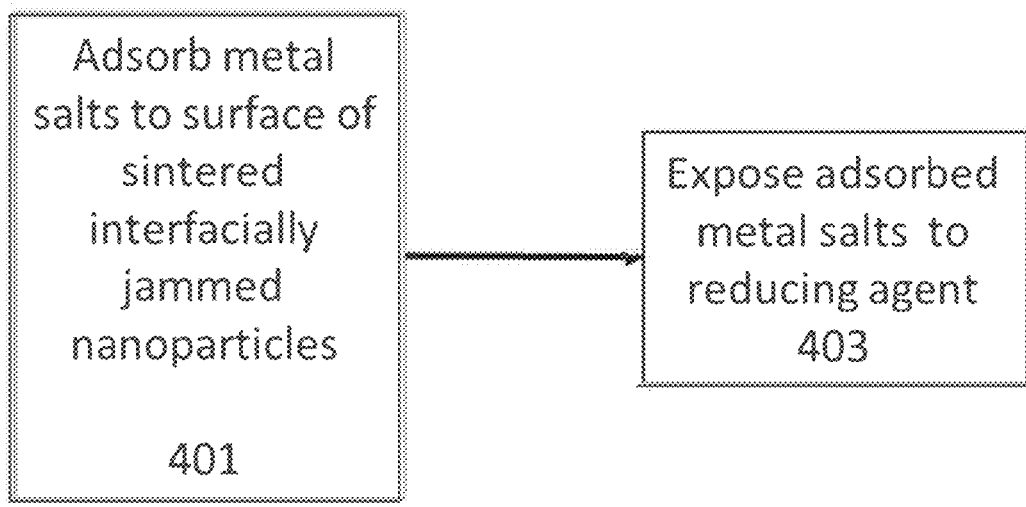
FIG. 4 provides a method of producing nanocatalyst-functionalized sintered bijels according to aspects of the disclosed technology.

In further examples, robust sintered bijels can be functionalized for heterogeneous catalysis by in situ synthesis of nanocatalysts (FIG. 4). First, at step 401, metal salts (MX) added to at least one phase of the bijel are adsorbed to the surface of the sintered, bridged interfacially jammed nanoparticles. Adsorption can occur via electrostatic interactions in which the pH is controlled such that the surface of the sintered nanoparticles are charged, and oppositely charged metal ions are attracted to the nanoparticles (e.g., pH is controlled within the bijel to be greater than 3.0, wherein silica nanoparticles have a negative charge; this induces adsorption of positively charged metal ions such as Ag+).

Another method of inducing adsorption of noble metal ions is by chemical adsorption via complexation with functional groups on the nanoparticle surface (e.g., amine or thiol groups on the surface of silica nanoparticles interact with noble metal ions).

The adsorbed the metal salts (MX) are then exposed at step 403 to a reducing agent (e.g., ascorbic acid) to form a metal nanocatalyst. Without being bound to any particular theory, this exposure process leads to the in situ formation of nanoparticle-supported metal nanocatalysts and functionalized, catalytic bijels.

Figure 5:
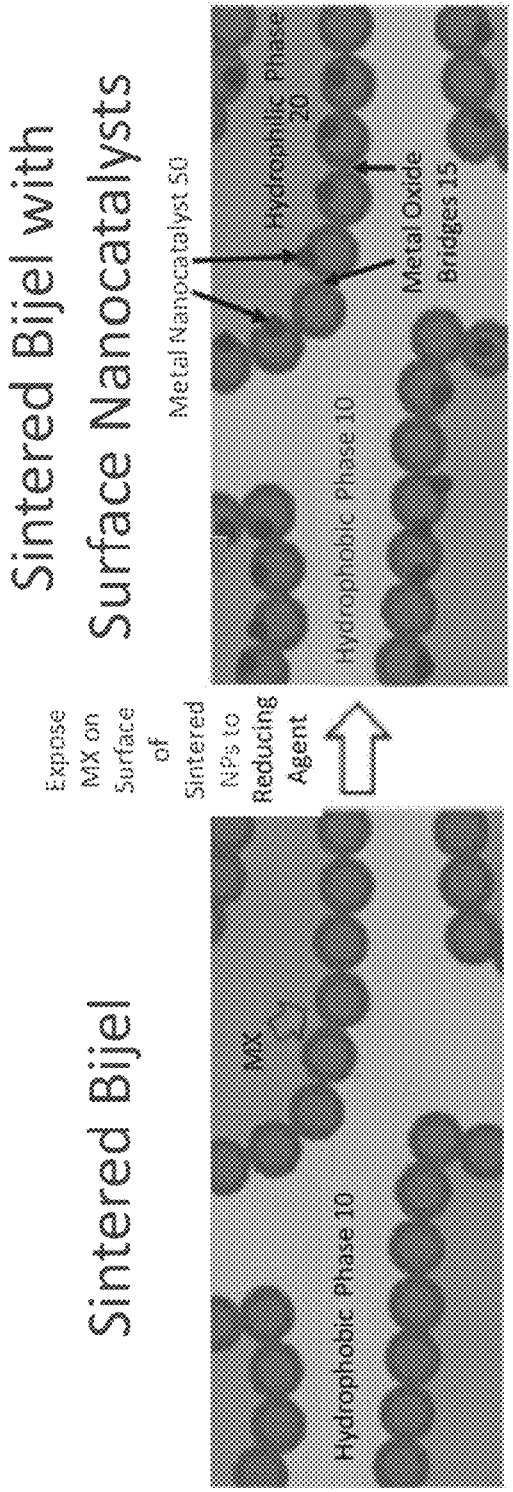
FIG. 5 provides a depiction of the process of functionalizing sintered bijels with nanocatalysts for heterogeneous catalysis according to aspects of the disclosed technology.

FIG. 5 depicts an illustration of the process carried out according to FIG. 4. Metal salts (MX) in the hydrophilic/aqueous phase 20 of the bijel are adsorbed to the sintered nanoparticles 25 connected by metal oxide bridges 15 at step 401. The adsorbed MX are then exposed to a reducing agent at step 403 to form metal nanocatalysts 50 on the surface of the sintered nanoparticles 25 and/or the metal oxide bridges 15 on the hydrophilic/aqueous side of the bijel.

In certain examples, a metal oxide from a precursor can serve a dual role of providing the mechanical and chemical reinforcement through the formation of sintered bridges between the nanoparticles and of providing catalytic functions after deposition. For example, titania, zirconia, alumina, tin oxide, copper oxide, and nickel oxide metal oxide bridges can also serve as nanocatalysts that can engage in heterogeneous catalysis within the bijel domains. Thus, metal oxide precursors including titanium tetrachloride, titanium isopropoxide, aluminum nitrate, copper methoxide, nickel 2-methoxyethoxide, and iron (III) chloride can be used to produce robust bijels (e.g., by being loaded into a STRIPS ternary mixture) having heterogeneous catalytic properties via sol-gel sintering, without requiring additional steps of adsorption and reduction. The formation of the metal oxide nanocatalysts can be accomplished by, e.g., a pH change or the addition of a reactant to the bijel with the metal oxide precursors, as opposed to the addition of a reducing agent for metal nanocatalysts formed from metal salts (MX).

In other examples, certain metal oxide precursors (e.g., aluminum nitrate) can be added to an already sintered, robust bijel. A reactant (e.g., ammonium carbonate) can be added to trigger the formation of catalyst (e.g., alumina) soluble in one or both of the bijel domains. The resulting soluble catalyst in the domain(s) participates in homogeneous catalysis.

Example 1—STRIPS Method of Forming Robust Bijels with Silica Bridges

Silica ($SiO_2$) nanoparticles were added to and dispersed within a ternary liquid mixture of hydrophilic/aqueous phase, hydrophobic/oil phase, and a miscibility-mediating solvent. The silica nanoparticles can already be surface-activated, or an opposite-charged ionic surfactant can be added to the ternary liquid mixture to adsorb to and impart surface activity to the silica nanoparticles. Tetraethyl orthosilicate (TEOS), a metal oxide precursor, was added to the ternary liquid mixture and dispersed within at least one of the phases (in this example, within the hydrophobic/oil phase). The ternary mixture was kept at 0° C. to avoid unwanted reaction before the bijel formation. The hydrophilic/aqueous phase contains around 10% of ethanol, which facilitated the dissolution of TEOS and enhanced the reaction kinetics. Ethanol, however, is optional as an additive to the hydrophilic/aqueous phase. (It should be understood that TEOS is only one example of a metal oxide precursor, and other metal oxide precursors can be used.)

The ternary liquid mixture was contacted with water, causing a spinodal phase separation inducing mass-transfer, which was arrested by the interfacial jamming of the silica nanoparticles. This resulted in a bijel. The TEOS dispersed within the hydrophobic/oil phase of the bijel were then hydrolyzed and condensed in a sol-gel reaction to form sintered silica bridges between the silica nanoparticles. The resulting sintered bijel was suitable for both homogeneous catalysis and mass transfer between the bicontinuous phases.

Example 2—STRIPS Method of Forming Sintered Bijels with Dual-Purpose Metal Oxide Precursors Silica ($SiO_2$) nanoparticles were added to and dispersed within a ternary liquid mixture. An oil phase selected for its low reactivity and relatively high boiling point was used (e.g., decalin, a mixture of bromobenzene/cyclohexanone). A miscibility-mediating solvent was used. Such solvents can be, e.g., acids and alcohols, such as ethanol, isopropanol, methanol, acetic acid, and the like.

The silica nanoparticles were added as an aqueous suspension of silica. An ionic surfactant (e.g., cetyltrimethylammonium bromide surfactant) was added to facilitate the dispersion of the nanoparticles in the ternary mixture and, without being bound to any particular theory, render the nanoparticles partially hydrophobic via electrostatic adsorption, making them more interface active. Other surfactants besides ionic surfactants can be used, although ionic surfactants are considered especially suitable.

Titanium alkoxide or titania precursor was added to the ternary liquid mixture and dispersed. The ternary liquid mixture was contacted with water, causing a spinodal phase separation inducing mass-transfer, which was arrested by the interfacial jamming of the silica nanoparticles. This resulted in a bijel. The titanium alkoxide or titania precursor dispersed within the bijel was then hydrolyzed and condensed in a sol-gel reaction to form sintered $TiO_2$ bridges between the silica nanoparticles.

The $TiO_2$ of the sintered bridges between the interfacially jammed silica nanoparticles can also serve as a metal oxide nanocatalyst for aldol condensation reactions. Thus, the titanium alkoxide or titania precursor can serve a dual purpose as both the precursor for imparting mechanical robustness to the nanoparticles of the bijel, and as a metal oxide nanocatalyst after formation of the sintered bridges. The resulting sintered bijel having the metal nanocatalyst was suitable for both heterogeneous catalysis and mass transfer between the bicontinuous phases.

To sinter using $TiO_2$, it is known that the sol-gel reaction rate of titania is very fast and more difficult to control than it is for silica. To alleviate this issue, precursors with different pendant groups (titanium-isopropoxide, -butoxide, -2-ethylhexyloxide etc.) can be used under varying pH and temperature conditions.

Example 3—STRIPS Formation of Sintered Bijels

Silica ($SiO_2$) nanoparticles were added to and dispersed within a ternary liquid mixture. An oil phase selected for its low reactivity and relatively high boiling point was used (e.g., decalin, a mixture of bromobenzene/cyclohexanone). A miscibility-mediating solvent (e.g., ethanol, isopropanol, methanol, acetic acid) was used. The silica nanoparticles were added as an aqueous suspension of silica. An ionic surfactant (e.g., cetyltrimethylammonium bromide surfactant) was added to facilitate the dispersion of the nanoparticles in the ternary mixture and, more importantly, render the nanoparticles partially hydrophobic via electrostatic adsorption, making them more interface active. TEOS was also added to the mixture to enable the sol-gel sintering. The ternary liquid mixture was contacted with water using a device comprising two concentrically aligned cylindrical capillaries, causing a spinodal phase separation inducing mass-transfer, which was arrested by the interfacial jamming of the silica nanoparticles. This resulted in a bijel fiber.

The concentration of TEOS and $SiO_2$ nanoparticles in the bijel can be varied. Sintering was performed by increasing the temperature and modulating the pH condition as a function of TEOS concentration.

Example 4—In Situ Synthesis of Ag, Pd, and Pt Catalysts in Sintered Bijels

Ag nanoparticles using $AgNO_3$ as the metal precursors were deposited on the sintered $SiO_2$ network via electrostatic interaction. When the silica nanoparticle surface is held at a pH above 3, the silica surface is negatively charged and attracts positively charged Ag+ metal ions. The adsorbed Ag+ ions were then reduced to form the Ag catalysts. To suppress leaching of the metal catalyst from silica, strong anchoring must be achieved between the reduced metal and silica. Addition of $H_2O_2$ also produced gas bubbles from these Ag-incorporated sintered bijels, strongly indicating the presence of catalytic nanoparticles.

A complexation reaction method can be used to deposit noble metals such as Pd and Pt on the sintered $SiO_2$ network. $PdCl_2$ or $K_2PtCl_4$ can be used as the metal precursor, and deposition on a sintered silica network of a bijel can be adjusted as a function of solution pH and Cl− concentrations. Speciation of palladium chloride or $K_2PtCl_4$ in water is known to depend on the solution pH and Cl-concentration, and the charge of silica also can be varied by the solution pH; these conditions can be varied. If deposition of Pd or Pt onto bare silica surface is challenging, amine and/or thiol groups can be incorporated into the sol-gel process using 3-aminotriethoxysilane, 3-mercaptopropyl trimethoxysilane, and TEOS to facilitate strong anchoring via complexation interactions. Reduction of Pd/Pt ions on the silica surface can be achieved using NaBH4 or ascorbic acid.

Example 5—Testing of Robustness and Physical Integrity of Sintered Bijels

Sintered bijels produced in Example 1 were subjected to immersion in ethanol for one hour, which is typically sufficient to cause the hydrophobic/oil phase and hydrophilic/aqueous phase to be miscible. Such miscibility would be capable of destroying an unsintered silica layer at the interface. However, the sintered bijels demonstrated excellent resistance to miscibility. The sintered silica nanoparticle network also remained porous, and interphase mass transfer occurred with little resistance as demonstrated by extraction of hydrophobic dye from the oil phase of the bijel upon the addition of ethanol.

Additionally, the sintered bijels are resistant to mechanical perturbation and drying. When subjected to shear by action of a magnetic stirrer in a cylindrical vessel, the stirrer generated a flow field of Reynolds number of $5 \times 10^4$ at the center of the container based on stirrer tip velocity (0.5 m/s) and length (1 cm) without evidence of damage to the bijel (the bijel fibers experience a lower Reynolds number outside the center). A doubling of this stirring rate did disrupt the bijel by removing small pieces, although it was not clear whether this is due to local weak spots made in placing the bijel into the vessel. As an alternative estimate of bijel strength, the bijel remained intact after drying, and thus withstood capillary stresses without damage to the sintered bijel structure. Estimating the stresses owing to capillarity as (interfacial tension)/(characteristic pore size) with interfacial tension of magnitude 30 mN/m and pores of typical radius of 1 μm suggested that the bijel is indeed very robust. In contrast, as-prepared, unsintered bijels lose their integrity upon drying.

Exemplary Embodiments

The following embodiments are exemplary only and do not limit the scope of the present disclosure or the appended claims.

Embodiment 1. A method of making a stabilized bijel, comprising: dispersing surface-active nanoparticles into a liquid mixture, the liquid mixture comprising a hydrophilic liquid, a hydrophobic liquid, and a solvent configured to mediate miscibility between the hydrophilic liquid and the hydrophobic liquid; dispersing one or more metal oxide precursors into the liquid mixture; contacting the liquid mixture with water, wherein the surface-active nanoparticles jam at an interface between the hydrophilic liquid and the hydrophobic liquid; and hydrolyzing and condensing the metal oxide precursors in a sol-gel reaction to form metal oxide bridges between the interfacially jammed surface-active nanoparticles, wherein the interfacially jammed surface-active nanoparticles are characterized as sintered.

Embodiment 2. The method of Embodiment 1, further comprising: adding one or more metal salts to the stabilized bijel after hydrolyzing and condensing in the sol-gel reaction; adsorbing the one or more metal salts to a surface of the sintered interfacially jammed nanoparticles; and synthesizing nanocatalysts on the surface of the sintered interfacially jammed surface-active particles by exposing the metal salts to a reducing agent.

Embodiment 3. A stabilized bijel, comprising: stable mixture of two immiscible liquids separated at an interface by one or more layers of jammed surface-active nanoparticles, and bridges between the interfacially jammed surface-active nanoparticles, wherein the interfacially jammed surface-active nanoparticles are sintered.

Embodiment 4. The stabilized bijel of Embodiment 3, further comprising catalytically active metal nanocatalysts and/or metal oxide nanocatalysts on a surface of the sintered interfacially jammed surface-active nanoparticles.

Embodiment 5. A method of making a stabilized bijel, the method comprising: dispersing metal oxide precursors into at least one phase of a bicontinuous interfacially jammed emulsion (bijel); and hydrolyzing and condensing the metal oxide precursors in a sol-gel reaction to form metal oxide bridges between interfacially jammed surface-active nanoparticles of the bijel, wherein the interfacially jammed surface-active nanoparticles are sintered.

Embodiment 6. The method of Embodiment 5, further comprising: adding metal salts to the stabilized bijel after hydrolyzing and condensing in the sol-gel reaction; adsorbing the metal salts to a surface of the sintered interfacially jammed nanoparticles; and synthesizing nanocatalysts on the surface of the sintered interfacially jammed surface-active particles by exposing the metal salts to a reducing agent.

Embodiment 7. The stabilized bijel of Embodiment 3, wherein the stabilized bijel is disposed at an interface between two immiscible fluids. As an example, the stabilized bijel can be disposed such that internal hydrophobic/oil channels of the bijel are in fluid communication with an external oil phase and the internal hydrophilic/aqueous channels of the bijel are in fluid communication with an external aqueous phase.

Embodiment 8. A method, comprising: with a mixture of two immiscible liquids separated at an interface by one or more layers of jammed surface-active nanoparticles, the mixture further comprising metal oxide bridges between the interfacially jammed surface-active nanoparticles; reacting a first species with the jammed surface-active nanoparticles so as to give rise to a reactive species on a surface of the jammed surface-active nanoparticles.

Embodiment 9. The method of Embodiment 8, wherein the species comprises a metal salt.

Embodiment 10. The method of any one of Embodiments 8-9, wherein the first species comprises a reducing agent.

Embodiment 11. The method of any one of Embodiments 8-9, wherein the reactive species comprises a catalyst.

Embodiment 12. A reactor system, comprising: an aqueous external phase; an organic external phase; a bijel portion that comprises a mixture of an aqueous liquid and an organic liquid separated at an interface by one or more layers of jammed surface-active nanoparticles, at least some of the jammed surface-active nanoparticles comprising bridges therebetween, the bijel portion defining a first plurality of channels comprising the aqueous liquid disposed therein and a second plurality of channels comprising the organic liquid disposed therein, and the first plurality of channels being in fluid communication with the aqueous external phase and the second plurality of channels being in fluid communication with the organic external phase.

Embodiment 13. The reactor system of Embodiment 12, wherein at least some of the plurality of jammed surface-active nanoparticles comprise a reactive species thereon. A reactive species can be a catalyst or other species that is not consumed. This is not a requirement, however, and the reactive species can include species that are consumed.

Embodiment 14. A method, comprising: with a reactor system according to Embodiment 13, effecting synthesis of one or more products, the synthesis being at least partially mediated by the reactive species.

Embodiment 15. The method of Embodiment 14, wherein the synthesis is effected within the aqueous liquid, within the aqueous external phase, or both.

Embodiment 16. The method of Embodiment 14, wherein the synthesis is effected within the organic liquid, within the organic external phase, or both.

Embodiment 17. The method of any one of Embodiments 14-16, wherein the one or more products are synthesized in a phase and are transported to another phase.

Embodiment 18. The method of Embodiment 17, wherein the one or more products are synthesized in at least one of the aqueous liquid and the aqueous external phase.

Embodiment 19. The method of Embodiment 17, wherein the one or more products are synthesized in at least one of the organic liquid and the organic external phase.

Embodiment 20. The method of any one of Embodiments 14-19, wherein the reactive species is characterized as a catalyst.

Although the technology is illustrated and described herein with reference to specific examples, the technology is not intended to be limited to the details shown. Rather, numerous variations, changes and substitutions will occur to those skilled in the art without departing from the spirit of the technology. Accordingly, it is intended that the appended claims cover all such variations as fall within the spirit and scope of the disclosure.

The invention claimed is:

1. A stabilized bicontinuous interfacially jammed emulsion (bijel), comprising:
    a stable mixture of two immiscible liquids separated at an interface by one or more layers of jammed surface-active nanoparticles, and
    bridges between the jammed surface-active nanoparticles of a layer of the one or more layers, wherein the jammed surface-active nanoparticles of said layer are characterized as sintered.

2. The stabilized bijel of claim 1, wherein one of the two immiscible liquids is a hydrophilic phase and the other of the two immiscible liquids is a hydrophobic phase.

3. The stabilized bijel of claim 1, wherein the jammed surface-active nanoparticles are charged.

4. The stabilized bijel of claim 3, wherein the jammed surface-active nanoparticles are positively charged.

5. The stabilized bijel of claim 3, wherein the jammed surface-active nanoparticles are negatively charged.

6. The stabilized bijel of claim 1, wherein the jammed surface-active nanoparticles comprise silica nanoparticles.

7. The stabilized bijel of claim 1, wherein the bridges comprise a metal oxide.

8. The stabilized bijel of claim 7, wherein the metal oxide comprises any one or more of titania, zirconia, alumina, tin oxide, copper oxide, and nickel oxide.

9. The stabilized bijel of claim 1, further comprising a catalytically active metal disposed on a surface of the sintered jammed surface-active nanoparticles.

10. The stabilized bijel of claim 9, wherein the catalytically active metal comprises any one or more of Ag, Pd, and Pt.

11. The stabilized bijel of claim 10, wherein the catalytically active metal comprises Ag.

12. The stabilized bijel of claim 10, wherein the catalytically active metal comprises Pd.

13. The stabilized bijel of claim 10, wherein the catalytically active metal comprises Pt.

* * * * *